No. 845,517. PATENTED FEB. 26, 1907.
A. A. CAILLE.
CONTROLLER FOR SPRING MOTORS.
APPLICATION FILED JUNE 4, 1906.

4 SHEETS—SHEET 1.

—Witnesses.—
W. Bruce Hudson.
Margaret Hurley.

—Inventor.—
A. A. Caille.
by Edward N. Pagelsen.
Attorney.

No. 845,517. PATENTED FEB. 26, 1907.
A. A. CAILLE.
CONTROLLER FOR SPRING MOTORS.
APPLICATION FILED JUNE 4, 1906.

4 SHEETS—SHEET 2.

Witnesses.-
W. Bruce Hudson.
Margaret Hurley.

Inventor.-
A. A. Caille.
by Edward N. Pagelsen
Attorney.

No. 845,517. PATENTED FEB. 26, 1907.
A. A. CAILLE.
CONTROLLER FOR SPRING MOTORS.
APPLICATION FILED JUNE 4, 1906.

4 SHEETS—SHEET 3.

Witnesses.—
W. Bruce Hudson.
Margaret Hurley

Inventor.—
A. A. Caille.
by Edward N. Pagelsen
Attorney.

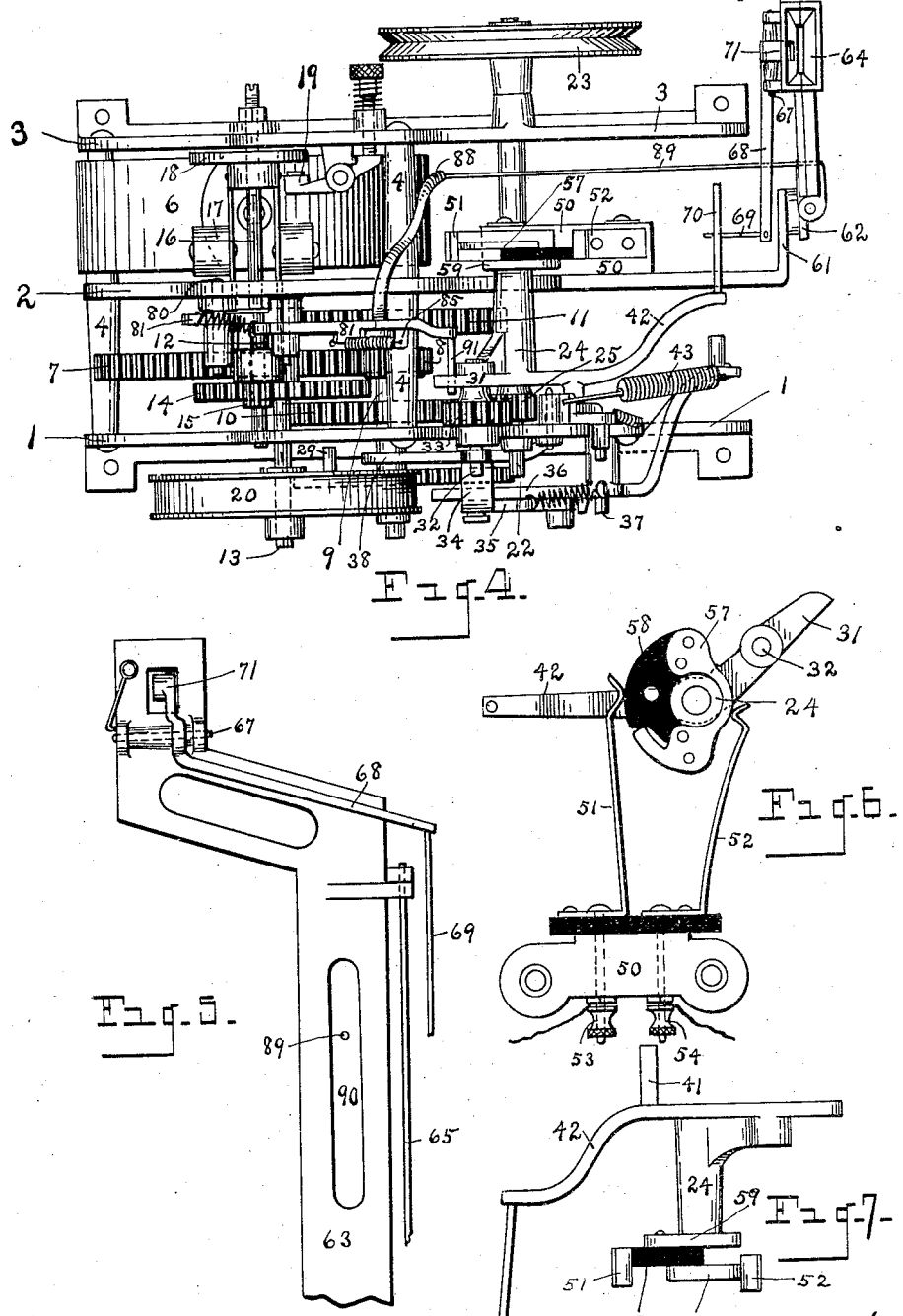

UNITED STATES PATENT OFFICE.

ADOLPH A. CAILLE, OF DETROIT, MICHIGAN.

CONTROLLER FOR SPRING-MOTORS.

No. 845,517. Specification of Letters Patent. Patented Feb. 26, 1907.

Application filed June 4, 1906. Serial No. 320,077.

*To all whom it may concern:*

Be it known that I, ADOLPH A. CAILLE, a citizen of the United States, and residing at Detroit, in the county of Wayne and State of Michigan, have invented a new and useful Controller for Spring-Motors, of which the following is a specification.

This invention relates to driving mechanism for phonographs and other sound-reproducing instruments, picture-exhibitors, and other machines where a certain predetermined amount of movement is required at uncertain intervals.

My invention consists of the combination of an electric motor of any well-known type, a spring-motor to actuate the sound-reproducing instrument or other machine to be driven, and a controller whereby the operation of the spring-motor, the operation of the electric motor, the winding of the spring, and the connection between the motor and spring are regulated.

Figure 1:
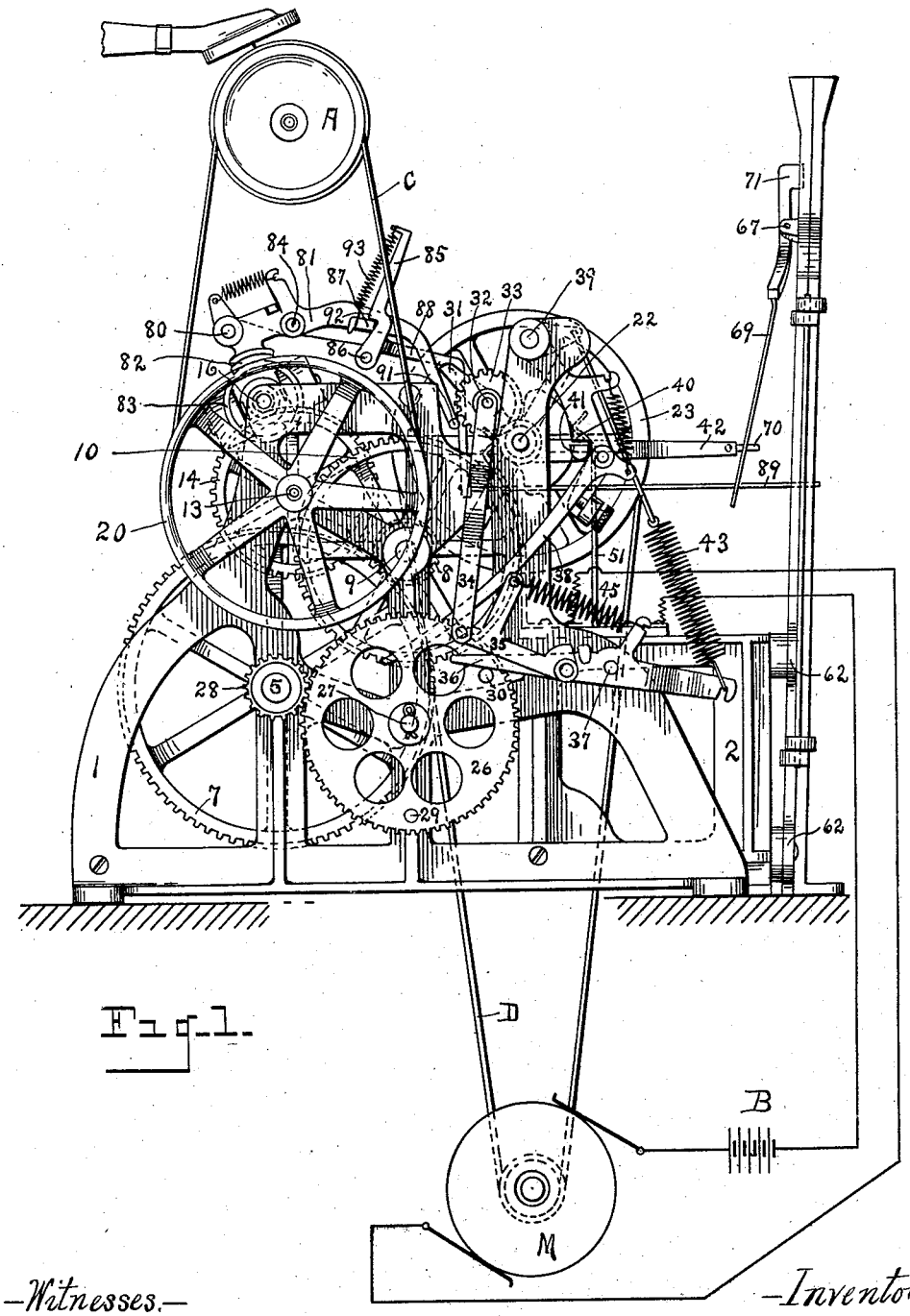
Figure 2:
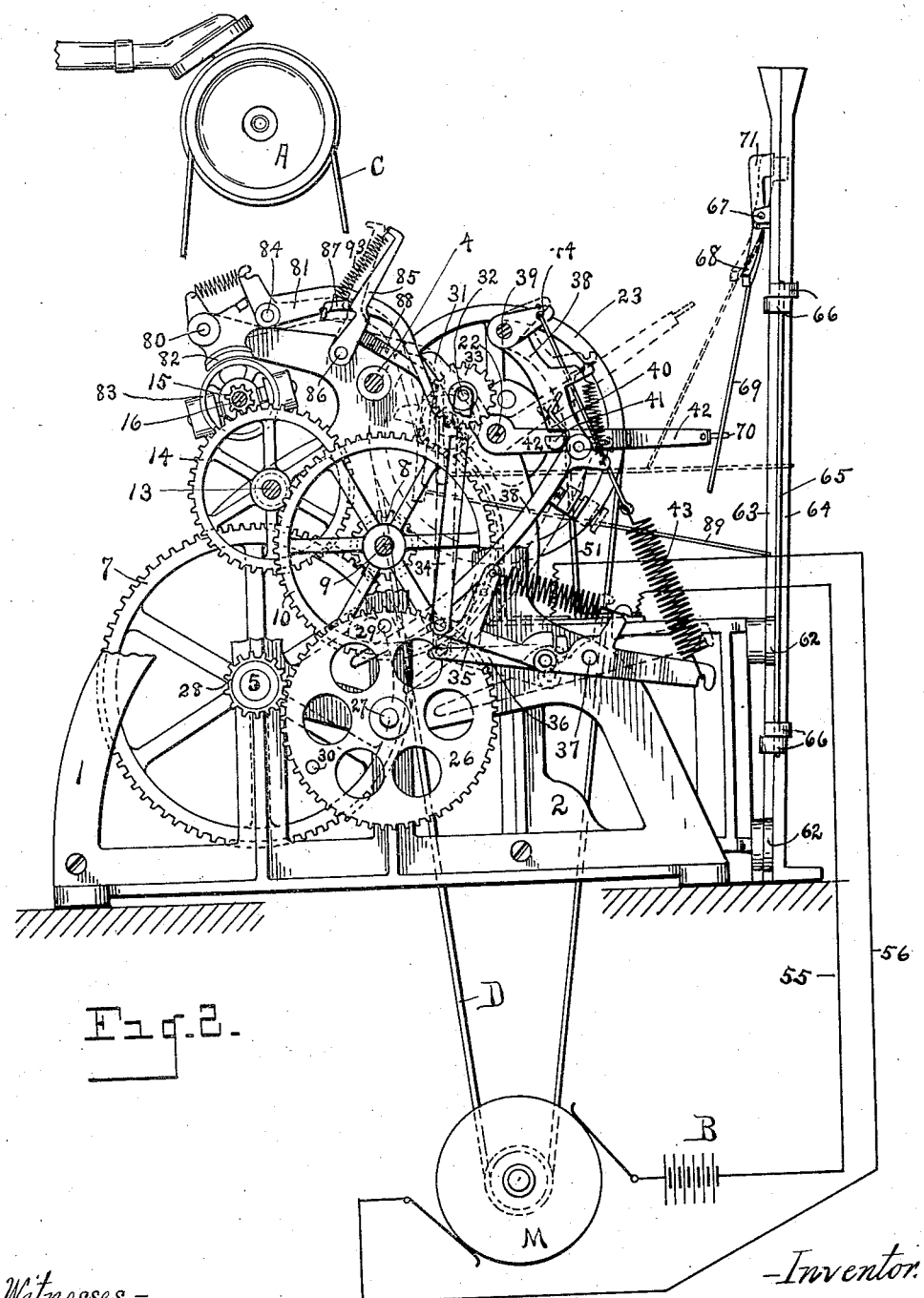
Figure 3:
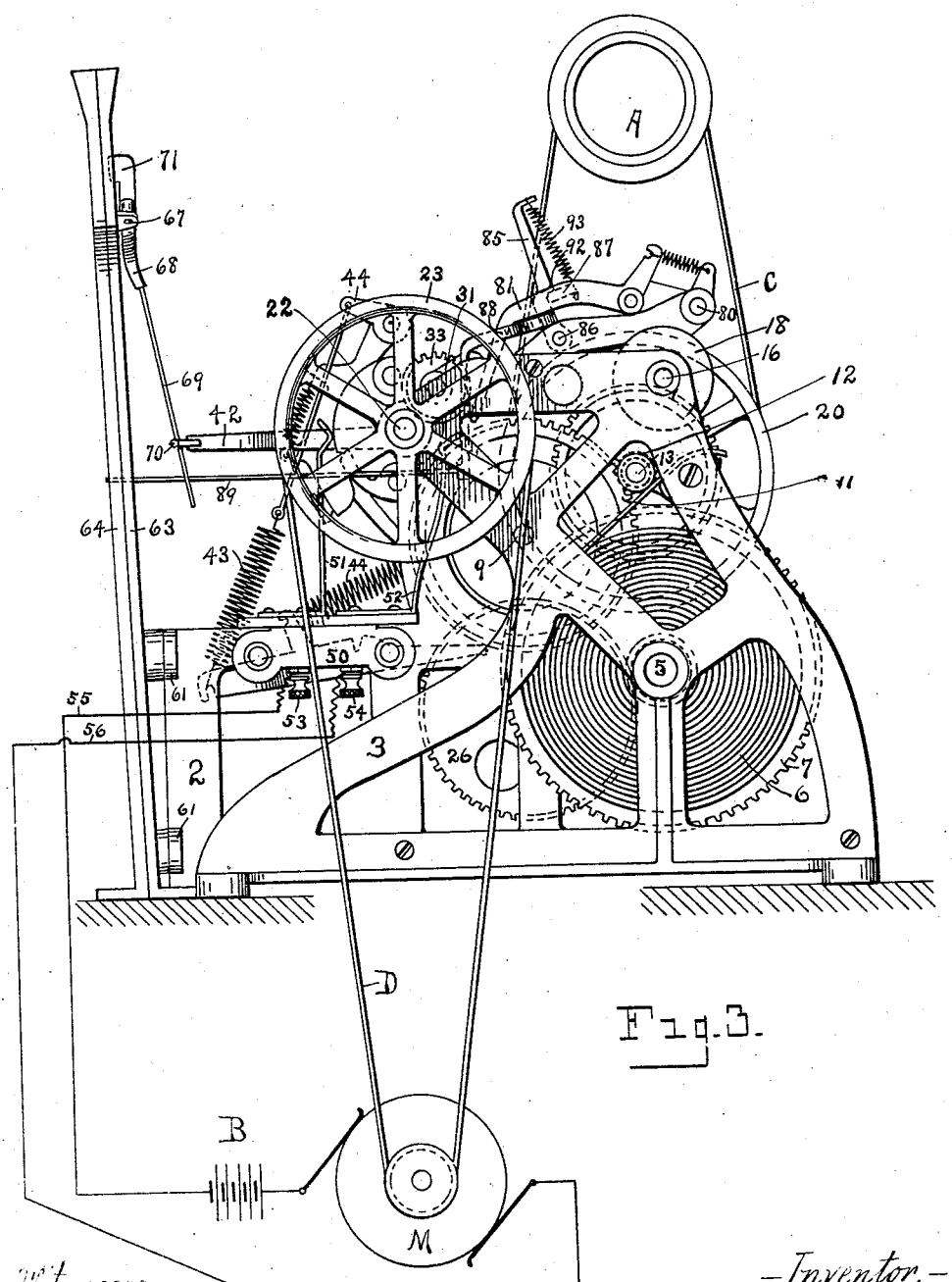

In the accompanying drawings, Figure 1 is a side view of the entire mechanism. Fig. 2 is a view of the same with a portion thereof broken away. Fig. 3 is a view of the opposite side. Fig. 4 is a plan. Figs. 5, 6, and 7 are details.

Similar reference characters refer to like parts throughout the several views.

In the drawings, A is a pulley of a sound-reproducing instrument. B is an electric-current source, and M is a motor. Belts C and D connect the sound-reproducer and the motor to the intermediate spring-motor, which forms the embodiment of my invention.

The larger portion of the construction shown is merely a modification of a common form of spring-driven actuating mechanism used for various purposes, and consists of three frames 1, 2, and 3, which are properly spaced apart by the short posts 4. The spring-shaft 5 connects to the spring 6 and carries the gear 7. The gear 7 meshes with the pinion 8 on the shaft 9, which shaft carries a gear 10 which is adapted to be engaged by the rewinding mechanism. A second gear 11 is mounted on this shaft so as to turn in but one direction with the shaft and is adapted to engage a pinion 12 on the shaft 13 and drive the same. The ends of part of the teeth of this pinion are indicated in Fig. 3. The shaft 13 carries a gear 14, which meshes with a pinion 15 on the governor-shaft 16. The governor 17 is of any desired type and has a friction-disk 18, which contacts with the free arm of the lever 19 whenever the desired speed is attained. The pulley 20 on the shaft 13 carries the belt C to the driven mechanism A. All the mechanism thus far described will be termed the "spring-motor," and any other type of spring-motor may be substituted for the same.

The shaft 22 is mounted in the frames 1 and 3, and is driven by the motor M and belt D, running on the pulley 23. On the shaft is also secured the pinion 25, and loosely mounted on this shaft is the sleeve 24. A gear 26 is mounted on the pin 27, projecting from the frame 1, and this gear 26 meshes with the pinion 28 on the shaft 5. The gear 26 has an inwardly-projecting pin 29 and an outwardly-projecting pin 30. These parts are so proportioned that the pinion 25 shall, by means of intermediate mechanism to be explained later, be connected to the gear 10 through levers controlled by the pin 29, which connection shall be simultaneous with the completion of the electric circuit to the motor by a movement of the sleeve 24, and which connection and rewinding of the spring shall continue until broken by the pin 30. The spring-motor is stopped and released by a brake, which acts in connection with the above-named mechanism.

The sleeve 24 is loose on the shaft 22 and is provided with an arm 31, which carries the pin 32, on which is mounted the pinion 33. A link 34 connects the pin 32 to the arm 35 of the lever 36, mounted on the pin 37 on the outside of the frame 1. It will be seen that one end of this lever 36 is in the path of the pin 30, which will raise this lever, and with it the link 34 and pinion 33, from the position indicated by dotted lines to that indicated by solid lines in Fig. 2. The final position is also shown in Fig. 1.

When the parts are in the position shown in Fig. 1, the spring-motor is wound to the desired amount, the electric-motor circuit is broken, and the pinion 33 is out of engagement with the gear 10. Upon releasing the spring-motor the gear 26 will turn to the right until the pin 29 reaches the position shown in Fig. 2, when it will engage the lever 38, pivoted on the pin 39. Continued movement of the gear 26 and lever 38 (to its dotted position) will move the shoulder 40 on this lever from over the lug 41 on the arm 42, that projects from the sleeve 24. When the shoulder 40 and lug 41 are disengaged, the spring 43, connected to the outer end of the lever 36, will pull down the link 34 and the pinion 33 into engagement with the gear 10 and the pinion 25 on the shaft 22, at the same time closing the circuit to the electric motor and stopping the spring-motor. The gear 26 will now be driven to the left by the electric motor until the pin 30 contacts with the lever 36 and lifts the pinion 33 out of engagement with the pinion 25 and gear 10, at the same time breaking the circuit to the electric motor. At the upper end of the lever 38 is an arm 44, to which the upper end of the spring 43 connects, and thus tends to hold the lower end of the lever 38 to the left, Figs. 1 and 2. Its movement toward the left is restricted by the lug 41, and whenever the arm 42 is brought down through the raising of the lever 36 by the pin 30 the shoulder 40 will lock the parts in the position shown in Fig. 1.

The connection between the arm 35 and lever 36 is a "spring and stop" for the sake of safety to the teeth of the gears 10, 25, and 33; but the spring 45 is so strong that the arm and lever practically acts as one. The lever 38 has an adjustable joint (shown in Figs. 1 and 2) for the purpose of accurate adjustment.

The description thus far indicates that the electric motor is cut out when the arm 42 on the sleeve 24 is in the position indicated in solid lines and cut in when the arm is in the position indicated by dotted lines in Fig. 2, when the winding-gearing is in operative connection. In Figs. 6 and 7 the switch is shown on a larger scale, attention being called to Fig. 3 also. A porcelain block 50 is secured to the frame 2. The spring-brushes 51 and 52 are connected to the screws 53 and 54 and to the wires 55 and 56, leading to the current source B and motor M, respectively. The sleeve 24 carries a disk 59, and on this is secured a piece of insulating material 58. To this insulating material is secured a metal connector which contacts with the brush 52, and when the pinion 25 is connected to the gear 10 through the pinion 33 by the turning of the sleeve 24 the connector 57 also engages the brush 51, and thus completes the circuit to the electric motor.

Secured to the frame 2 by means of the lugs 61 and 62 is the coin-chute, which is formed of a main portion 63 and a portion 64 hinged thereto, the rod 65 passing through the hinge-lugs 66. Pivoted at 67 near the upper part of the chute is a lever having its lower arm 68 turned toward the arm 42 and provided with a light rod 69, which crosses the path of the light rod 70 on the arm 42. The upper end 71 of this lever is heavy and passes through an opening in the wall of the part 63 of the chute and may extend across the passage therein. While the arm 42 is in the position shown in solid lines in Fig. 2 the rod 70, contacting with the rod 69, holds the end 71 back; but during the rewinding of the spring-motor the end 71 closes the chute and prevents coins passing down until the spring-motor is again in operative condition.

On a pin 80, secured to the frame 2, is mounted a lever 81, having a brake-shoe 82, mounted on its lower arm, adapted to contact with the wheel 83 on the shaft 16 of the speed-governor. The main arm of the lever has a relieving-joint 84 to permit the free end of the lever to be depressed beyond the necessary distance should the other mechanism overthrow. A catch 85 is pivoted to the frame 2 at 86 and is adapted to engage the shoulder 87 on the lever 81 and hold the shoe 82 against the wheel 83. Integral with this catch 85 is an arm 88, carrying a rod 89, that projects through a slot 90 in the coin-chute and is adapted to be depressed by the coin passing down the chute. The depression of this rod by the coin releases the governor of the spring-motor and permits the motor to run. The lever-arm 81 has a pin 91 projecting into the path of the arm 31 on the sleeve 24.

The operation of this controlling mechanism is as follows: The spring-motor having finished its work, the pin 29 causes the lever 38 to release the lug 41 on the arm 42, so that the spring 43 can pull the pinion 33 into mesh with the pinion 25 and the gear 10. The pinion 33 being mounted on the arm 31, the sleeve 24, the arm 42, and the switch which completes the circuit to the electric motor will move with the pinion 33. The arm 42, swinging to the dotted position in Fig. 2, releases the arm 68 of the coin-controlling lever and the heavy upper arm 71 closes the chute. The arm 31 bears down on the pin 91, forcing down the long arm of the lever 81 to apply the brake to the governor of the spring-motor. The lug 87 on this arm slides down along the face of the catch 85 until it passes the shoulder 92, when the spring 93 will pull the catch into operative position to hold down the lever 81 and brake-shoe, the rod 89 moving from the position shown by the solid to that shown by the dotted lines in Fig. 2. These last-named parts are then in the positions shown in Fig. 1, and all the movements except that of the lever 38 have been caused by the spring 43. The electric motor now drives the winding-gears, the gear 26 moving to the left, Figs. 1 and 2, until the pin 30 strikes the lever 36 and lifts the pinion 33 out of gear. In the operation of the machine there is a tendency for the gear 10 and pinion 25 to hold the pinion 33, and the spring between the lever 36 and arm 35 will be put under some tension until the upward pressure on the lever 36 is sufficient to overcome this reluctance, when the spring will throw the pinion 33 quite clear of the gear 10 and pinion 25. The sleeve 24 moves with the pinion 33, as before. The arm 31 lifts up, releasing the pin 91 on the lever 81. The arm 42 swings down and swings the lever end 71 out of the coin-passage in the chute. The spring-motor, however, is held by the brake-shoe 82. If a coin be now dropped through the chute, it will strike the rod 89, Fig. 2, depressing it to the position shown in solid lines and with it the lever 88, swinging back the catch 85 and releasing the lever 81, the spring 93 then raising this lever and releasing the governor. The spring-motor then moves its required number of revolutions, or until the pin 29 on the gear 26 (which has been turning to the right) again actuates the releasing-lever 38. There are thus three cycles of movement: first, the throwing in of the gearing to rewind and at the same time forming the circuit to the electric motor; second, throwing out the rewinding-gearing and breaking the circuit to the motor, and, third, the operation or unwinding of the spring-motor when a coin passes through the chute. It will be noticed that the relative positions of the pins 29 and 30 absolutely determine the number of revolutions of the electric and spring motors and that the tension of the spring 6 has no effect on the number of revolutions, also that this spring is rewound the exact amount that it is unwound, no matter at what point of its unwinding the lever 38 is actuated.

Having now explained my improvements, what I claim as my invention, and desire to secure by Letters Patent, is—

1. The combination of a spring-motor, an electric motor for winding the same, a gear to connect said electric motor and spring-motor, and means adapted to be actuated by the spring-motor and the electric motor alternately to control the position of said connecting-gear.

2. The combination of a spring-motor, a winding mechanism for the same comprising a normally disconnected primary motor, means to connect said primary motor and spring-motor, a governor for the spring-motor, a stop mechanism for the same, and controlling means to fix the amount the spring-motor is wound and unwound and also control the operation of the stop mechanism for the governor.

3. The combination of a spring-motor comprising a gear having projecting pins, an electric motor for rewinding the spring-motor, connecting means between the electric motor and the spring-motor, and mechanism adapted to be controlled by the pins on said gear whereby the current to said electric motor is controlled and whereby the connection between said electric motor and said spring-motor is moved into and out of operative position.

4. The combination of a spring-motor, an electric motor for winding the same, a movable gear to connect said electric motor and spring-motor, and means adapted to be actuated alternately by the spring-motor and by the electric motor whereby the electric motor is connected to rewind and disconnected after the spring-motor has been rewound predetermined amounts respectively.

5. In a spring-motor, the combination of a train of gears, one of them having projecting pins, a shaft operative connected to an electric motor, a gear on the shaft, a sleeve loosely mounted on said shaft and provided with an arm carrying a pinion and a switch mechanism for said electric motor, and connecting mechanism between the pins on the gear and the sleeve whereby the pinion may be moved to connect and disconnect the gear on the motor-shaft with the train of gears of the spring-motor, and the switch mechanism is caused to make and break the circuit to the electric motor.

6. The combination of a spring-motor, a primary motor for winding the same, means to connect the primary motor and the spring-motor, means to disconnect said motors and mechanism under the control of the spring-motor to cause its connection to the primary motor.

7. The combination of a spring-motor, a primary motor for winding the same, means to connect the said motors, and means to disconnect said motors, said disconnecting means controlled by the winding mechanism of the spring-motor.

In testimony whereof I have signed this specification in the presence of two subscribing witnesses.

ADOLPH A. CAILLE.

Witnesses:
A. ARTHUR CAILLE,
EDGAR ELLIOTT.